US009534386B2

(12) United States Patent
Brothersen

(10) Patent No.: US 9,534,386 B2
(45) Date of Patent: *Jan. 3, 2017

(54) TRUSS ASSEMBLY AND METHOD FOR MAKING THE SAME

(71) Applicant: NUCOR CORPORATION, Charlotte, NC (US)

(72) Inventor: Bruce F. Brothersen, Brigham City, UT (US)

(73) Assignee: NUCOR CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,362

(22) Filed: Mar. 9, 2015

(65) Prior Publication Data

US 2015/0176280 A1 Jun. 25, 2015

Related U.S. Application Data

(63) Continuation of application No. 12/703,323, filed on Feb. 10, 2010, now Pat. No. 8,991,388.

(51) Int. Cl.
*E04C 3/02* (2006.01)
*E04C 3/09* (2006.01)
(Continued)

(52) U.S. Cl.
CPC .. *E04C 3/09* (2013.01); *F24J 2/46* (2013.01); *F24J 2/5233* (2013.01); *F24J 2/541* (2013.01);
(Continued)

(58) Field of Classification Search
CPC ........ E04C 3/09; E04C 2003/0491; F24J 2/46; F24J 2/541; F24J 2/5233; F24J 2/5252; F24J 2002/4656; H01L 31/0422; H02S 20/00; H02S 20/30; Y10T 29/49625; Y02E 10/47; Y02E 10/50
(Continued)

(56) References Cited

U.S. PATENT DOCUMENTS 3,106,995 A 10/1963 Abramson
4,223,662 A 9/1980 Lunde et al.
(Continued)

FOREIGN PATENT DOCUMENTS

GB 1413653 A * 11/1975 ............... E04B 7/00

*Primary Examiner* — Charles A Fox
*Assistant Examiner* — James Buckle, Jr.
(74) *Attorney, Agent, or Firm* — Moore & Van Allen PLLC; Jeffrey R. Gray

(57) ABSTRACT

Embodiments of the invention comprises a truss assembly and a method for assembling the truss assembly. The truss assembly includes V-shaped longitudinal supports forming corners of an elongated truss located at each angle of a polygonal axial cross-section. Open webs are fixedly attached between each adjacent V-shaped longitudinal supports extending the length of the elongated truss. The open webs have a plurality of bends in a same plane, and the plurality of bends are welded to a portion of the inner surface of adjacent V-shaped longitudinal members without having to place jigs or bracing to form the open web or to secure the open web to the two V-shaped longitudinal members. The elongated support truss may have a triangular cross-section, a rectangular cross-section, a square cross-section, a pentagonal cross-section, or the like.

21 Claims, 4 Drawing Sheets

(51) Int. Cl.
  *F24J 2/52*    (2006.01)
  *F24J 2/54*    (2006.01)
  *H01L 31/042*  (2014.01)
  *H02S 20/30*   (2014.01)
  *F24J 2/46*    (2006.01)
  *H02S 20/10*   (2014.01)
  *E04C 3/04*    (2006.01)

(52) U.S. Cl.
  CPC ............... *H02S 20/00* (2013.01); *H02S 20/10* (2014.12); *H02S 20/30* (2014.12); *H02S 20/32* (2014.12); *E04C 2003/0491* (2013.01); *F24J 2/5252* (2013.01); *F24J 2002/4656* (2013.01); *Y02E 10/47* (2013.01); *Y02E 10/50* (2013.01); *Y10T 29/49625* (2015.01)

(58) Field of Classification Search
  USPC .......................................................... 52/633
  See application file for complete search history.

(56) References Cited

U.S. PATENT DOCUMENTS

| | | |
|---|---|---|
| 4,249,514 A | 2/1981 | Jones |
| 4,386,600 A | 6/1983 | Eggert, Jr. |
| 4,429,178 A | 1/1984 | Prideaux et al. |
| 4,543,761 A | 10/1985 | Mockovciak, Jr. |
| 4,594,470 A | 6/1986 | Headrick |
| 4,653,470 A | 3/1987 | Carli et al. |
| 4,730,602 A | 3/1988 | Posnansky et al. |
| 4,937,997 A | 7/1990 | Thomas, Jr. et al. |
| 5,125,206 A | 6/1992 | Motohashi et al. |
| 5,632,823 A | 5/1997 | Sharan |
| 6,065,267 A | 5/2000 | Fisher |
| 6,076,770 A | 6/2000 | Nygren et al. |
| 6,269,904 B1 | 8/2001 | Morhaus |
| 6,321,503 B1 | 11/2001 | Warren |
| 6,457,293 B1 * | 10/2002 | Tsai ................ E04B 2/8658 52/481.1 |
| 6,571,527 B1 * | 6/2003 | Rattini ................ E04C 3/08 52/692 |
| 6,912,816 B2 | 7/2005 | O'Leary |
| 2004/0144055 A1 | 7/2004 | Lewison |
| 2006/0157050 A1 | 7/2006 | Le Lievre |
| 2009/0095283 A1 | 4/2009 | Curtis et al. |
| 2009/0114211 A1 | 5/2009 | Homyk et al. |
| 2010/0051016 A1 | 3/2010 | Ammar |
| 2010/0206303 A1 | 8/2010 | Thorne |
| 2010/0229851 A1 | 9/2010 | Reynolds |

\* cited by examiner

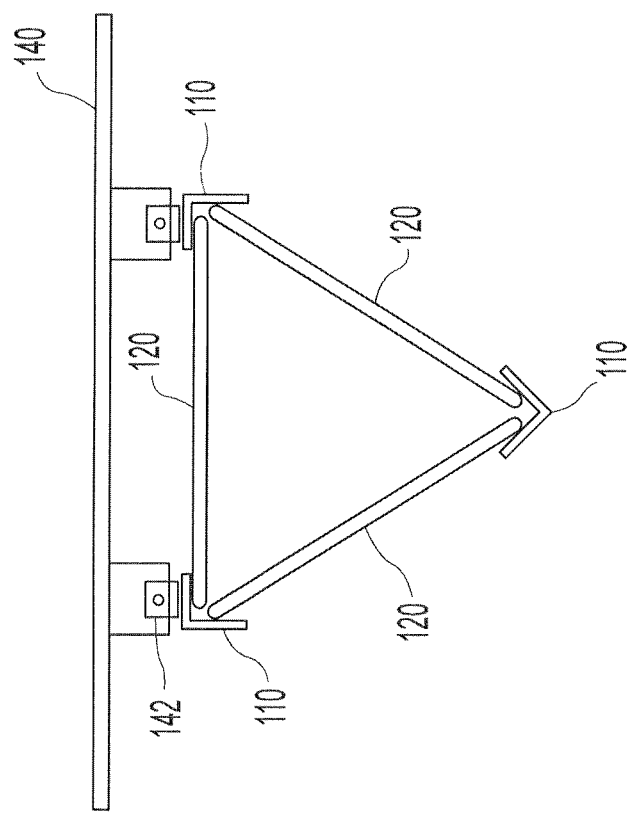

TRUSS ASSEMBLY AND METHOD FOR MAKING THE SAME

CROSS REFERENCE TO RELATED APPLICATIONS

This application is a continuation of, and claims priority to, co-pending U.S. patent application Ser. No. 12/703,323, filed on Feb. 10, 2010 and entitled "SOLAR ARRAY ASSEMBLY AND METHOD FOR MAKING THE SAME," the entire contents of which are incorporated herein by reference herein.

BACKGROUND AND SUMMARY OF THE INVENTION

This invention relates generally to solar array assemblies, and inexpensive trusses adapted to support solar array assemblies.

A photovoltaic module or photovoltaic panel with an interconnected assembly of photovoltaic cells, also known as solar cells, is used for generating electricity. The photovoltaic module, known more commonly as the solar panel, is then used in a larger photovoltaic system to generate electricity for commercial and residential applications. A photovoltaic installation typically includes an array of photovoltaic modules or panels, an inverter, batteries and interconnection wiring.

Generally, solar arrays are sited in locations having low annual average cloud cover, for example in deserts. Deserts are also known to have high winds, low rainfall amounts, and typically are relatively warm compared to other environs. These environmental factors may lead to more rapid wear and deterioration of mechanical systems, resulting in the need for relatively more frequent maintenance and repair of such systems. As deserts are typically sparsely populated, if at all, maintenance of mechanical systems, including solar arrays, is a time consuming and expensive proposition. As such, the need for robust solar array systems requiring decreased maintenance and repair as compared to standard solar arrays has been identified.

A major limitation of these solar arrays is the cost of assembly and construction. The arrays must be massive to generate electricity at commercial levels, which makes building arrays from photovoltaic modules marginal, if not commercially impractical.

Traditionally, support structures have been assembled by attaching a single diagonal brace between two longitudinal members, requiring a means for insuring the longitudinal members are evenly spaced at a desired distance, maintained in a parallel orientation, and that the brace is positioned at the proper angle between the two longitudinal members. Once these components are properly aligned, the brace is then fastened to the longitudinal members with a spot weld or appropriate fastener at each end of the brace. A second brace is then placed between the two longitudinal members beginning at one end of the first brace and running along the opposite diagonal to the other longitudinal member, at which point the second brace is then fastened at each end to the longitudinal members. As can be seen, such a manufacturing process requires the use of two spot welds or two fasteners for each brace. This process is time-consuming and requires an operator to place a brace, fasten it, then place a next brace and fasten it, repeating the process until one side of a support structure is completed. Once one side of the support structure has been completed, the process must be repeated for each additional desired side Moreover, there are hundreds of such braces to be assembled for a solar array to produce electricity at a commercial level, a process which is labor intensive, provides significant opportunity for error, and therefore, is expensive.

What is needed to make these solar arrays commercially feasible is a method for inexpensive assembly of solar arrays from commercially available component structures.

The present disclosure describes a movable solar array which may comprise an elongated support truss having a polygonal cross-section. The support truss may have V-shaped longitudinal members forming the corners of the polygonal axial cross-section. An open web may be fixedly attached between each V-shaped longitudinal member and extend the length of the elongated truss along each side of the polygonal axial cross-section. End members may be fixedly attached at each end of the longitudinal support truss and may have a shaft extending longitudinally outwardly from the end member, where the shaft may be adapted to engage a drive provided to rotate the elongated truss. The solar array may further comprise solar panels attached along one side of the elongated truss of polygonal axial cross-section. In addition, the solar array may also comprise at least one rotatable drive capable of rotatably driving the shafts at the ends of the elongated truss to move the solar panels in relation to a change of direction of incoming solar energy.

The polygonal axial cross-section may be selected from the group consisting of a triangular cross-section and a rectangular cross-section.

The open web may be formed of steel joist webbing or bent rebar, and may be fixedly attached to the V-shaped longitudinal supports. Specifically, the open web may be welded to the V-shaped longitudinal supports. It is also envisioned that the V-shaped longitudinal supports may be L-shaped longitudinal members.

The outwardly extending shaft may be located at a position other than the center of mass of the axial cross section.

Alternatively, the disclosure describes a method for collecting solar energy comprising the steps of assembling an elongated support truss of a polygonal axial cross-section with V-shaped longitudinal supports forming corners of the elongated truss of polygonal axial cross-section, open webs fixedly attached between each V-shaped longitudinal support along each side of polygonal axial cross-section extending the length of the elongated truss, and an end member fixedly attached at each end of the support truss including a shaft extending longitudinally outwardly from the end member adapted to engage a drive to longitudinally rotate the elongated truss. Solar panels may be attached along one side of polygonal cross-section of the elongated truss. Additionally, at least one rotatable drive may be assembled which is capable of rotably driving the shafts at the end of the elongated truss to move the solar panels corresponding to a change of angle of incoming solar energy incident upon the solar panels with the movement of the sun over a day. Incoming solar energy may be captured using the solar panels by rotating each solar array in relation to a change of angle of the incoming solar energy, and the captured incoming solar energy may be transformed into electrical energy for an electrical system, which may be, for example, a battery or a municipal power grid.

BRIEF DESCRIPTION OF THE DRAWINGS

FIG. 3 is an enlarged perspective view of a portion of the solar array assembly of FIG. 1;

DETAILED DESCRIPTION OF THE DRAWINGS

Figure 1:
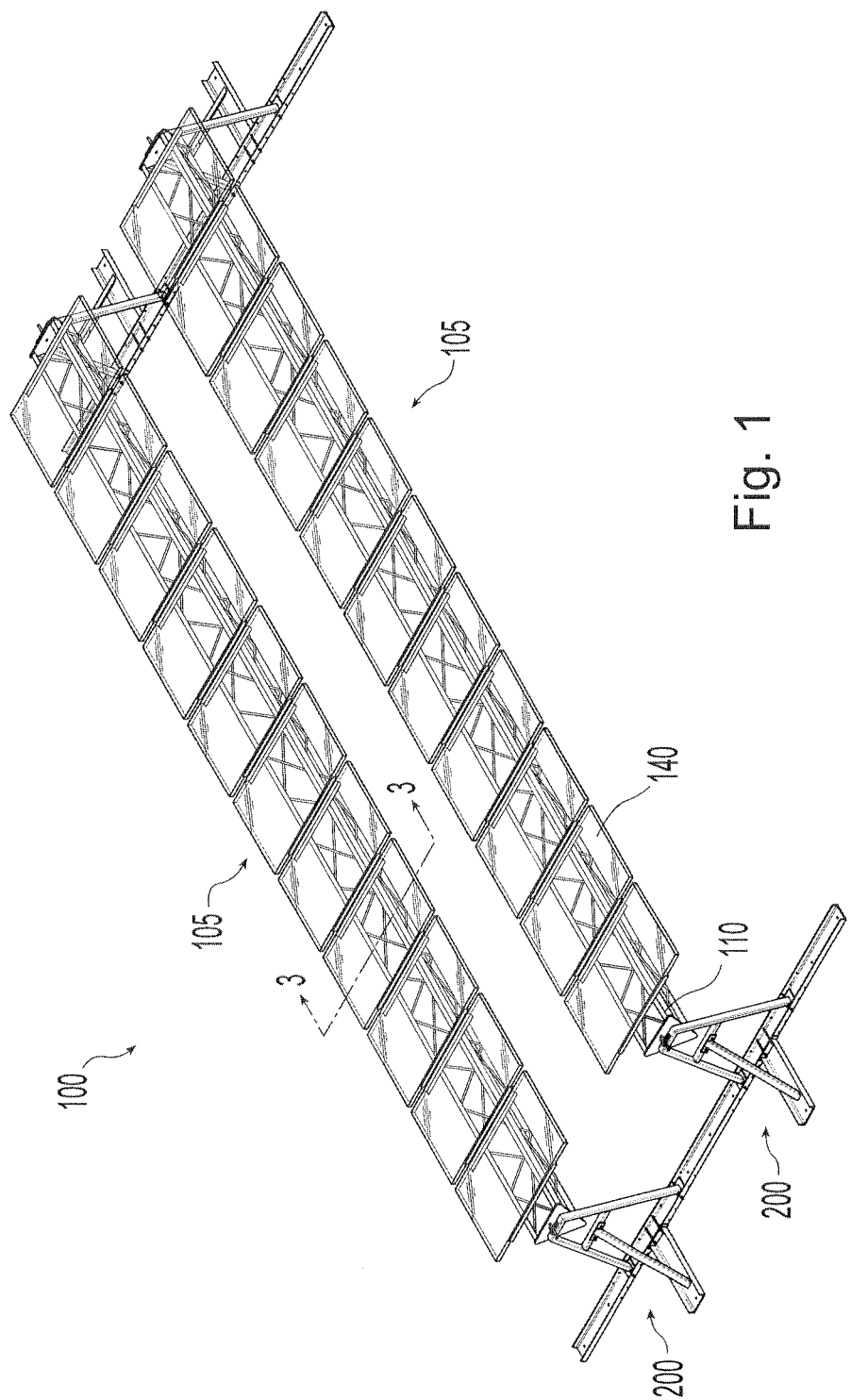
FIG. 1 is a side perspective view of an illustrative solar array assembly.
Figure 2:
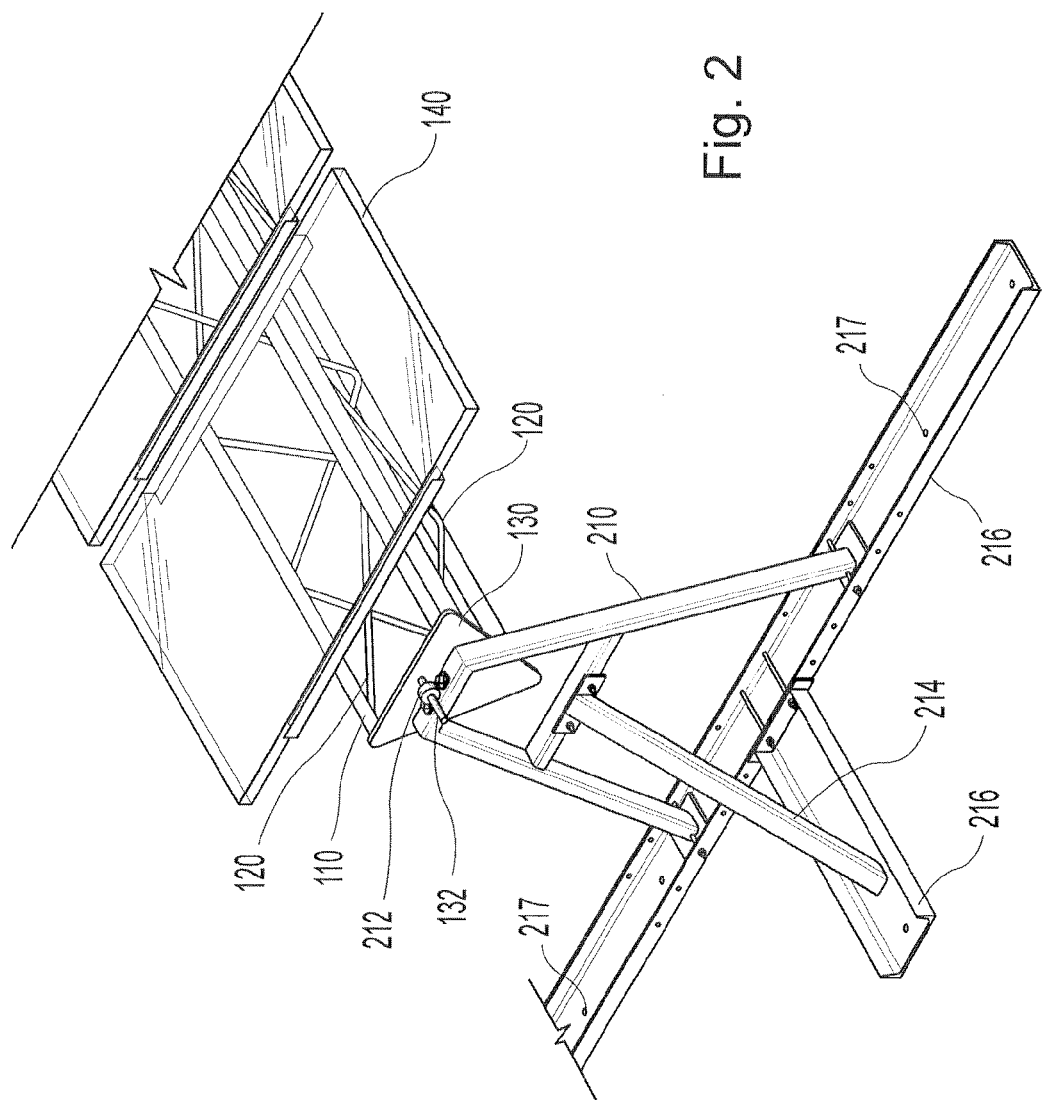
FIG. 2 is an enlarged sectional view of a portion of the solar array assembly of FIG. 1 along line 2-2.

Referring to FIGS. 1-3, a movable solar array 100 comprises an elongated support truss 105 having a polygonal cross-section, as best shown in FIG. 2. V-shaped longitudinal members 110 may be located at each corner of the cross-section. Additionally, an open web 120 may be fixedly attached between each V-shaped longitudinal member 110 and may extend the length of the elongated truss 105 along each side of the polygonal axial cross-section. Further, an end member 130 may be fixedly attached to each end of the elongated truss 105, with a shaft 132 extending longitudinally outwardly from each end member 130. Solar panels 140 may be attached along one side of the elongated truss 105. In order to increase the amount of solar energy incident upon solar panels 140, shaft 132 may be adapted to engage a rotatable drive, which may in turn rotate the solar array 100 in relation to a change in direction of solar energy incident upon the solar panels.

The polygonal axial cross-section of the elongated truss 105 may be a triangular cross-section, although the polygonal cross-section may alternately be a rectangular cross-section, a pentagonal cross-section, or any other desired polygonal cross-section. The dimensions of the axial cross-section are constant along the entire length of the elongated truss 105. As such, V-shaped longitudinal members 110 may be formed at an angle which is about 360 divided by the number of sides of the polygon. For example, when the polygonal cross-section is a triangular cross-section, the V-shaped longitudinal member may be formed at about 60° inside angle. Similarly, when the polygonal cross-section is a rectangular cross-section, the V-shaped longitudinal members 110 may be formed at about 90°. Thus, V-shaped is defined to mean having an angle less than about 180°. Alternately or additionally, one or more of the V-shaped longitudinal members may be L-shaped, that is, one side of the longitudinal member may be longer than the other side.

In manufacture, V-shaped longitudinal members 110 may be formed by continuous strand caster. Alternatively, V-shaped longitudinal supports may be formed from hot rolled angle iron having a 90° angle. Open web 120 may be steel joist webbing or bent rebar formed from cast or hot-roll and shaped on a bender used for making webs for steel joist, which typically may be between about ½ and 1 inch in diameter, although smaller and larger diameters are also contemplated depending upon the required support necessary from the support truss. Additionally, both end member 130 and shaft 132 may be formed of hot-rolled steel. As each of longitudinal members 110, open web 120, end member 130, and shaft 132 may formed from hot-rolled steel, these components may be fixedly attached or joined to each other by welds formed by an arc welding process. Alternately or in addition, open webs 120 and end members 130 may be joined to longitudinal members 110 using conventional fasteners known in the art.

As described above, the traditional method for assembling support truss for solar arrays is time consuming, labor intensive, and prone to error. By contrast, the presently disclosed method for making the present support truss may be assembled rapidly from relatively few commercially available components. As opposed to the individual braces which must be places, aligned, and attached one-by-one to a pair of parallel support members, the presently disclosed elongated truss 105 may be assembled by simply placing an open web 120, such as steel joist webbing, between two longitudinal members 110 and then attaching each bend of the open web 120 to each of the members 110. Although each bend of the open web 120 is welded to longitudinal members 110, the welding process is performed continuously along the length of each side in the manner webbing in steel joist is assembled, without stopping to place a brace, picking up the torch to weld, setting down the torch to place a brace, ad infinitum, until the side of the support truss is completed. As such, we have found that the presently disclosed method of assembling a support truss is significantly faster than those methods disclosed in the prior art. Even in situations where the desired support truss is longer than commercially available open webs 120 available in metal joist manufacture, provision and attachment of a second open web to meet the desired length of the support truss permits significantly faster assembly than by prior art methods.

By providing commercially available open webs 120 and longitudinal members 110, the cast or shaping of the elongated truss 105 may further reduce dimensional variation in assembled support trusses without additional expense to assembly. This is in direct contrast to prior art methods of assembling support trusses, which utilize jigs or other additional means for decreasing variability in final assembly, thereby increasing the cost of assembly. The truss 105 may be assembled relatively inexpensively using the same production lines used for making steel joist for buildings.

A series of solar panels 140 may be affixed to one face of elongated truss 105, using, for example a series of solar panel frames 142. Solar panel frames 142 may be configured to selectively affix a single solar panel 140 to elongated truss 105, yet also permit solar panels 140 to be selectively removed for repair, maintenance, or other desired purposes. Alternatively, solar panels 140 may be adapted to be fixed to elongated truss 105 using fasteners, for example bolts and nuts, without additional solar panel frames 142.

The entire elongated truss 105 may be supported at each end by a truss support 200. Each truss support 200 may include an A-frame member 210. Truss support 200 may further include brace 214, which is joined at an angle to both A-frame member 210 and a skid member 216. The skid 216 may include a series of apertures 218 configured to accept a stake or other elongated member which may be driven through aperture 218 into the ground under the skid member 216 in order that skid member is fixed to the ground. Alternatively, in situations where it is desired to locate a solar array 100 on relatively hard ground, self-drilling, self-tapping fasteners may be driven through apertures 218 to secure skid member 216 to the ground.

A collar 212 may be attached to each A-frame 210, or alternatively, the collar 212 may be formed as part of A-frame. Collar 212 may be configured to receive shaft 132, therein permitting elongated truss 105 to rotate in conjunction with rotation of shaft 132.

Figure 4A:
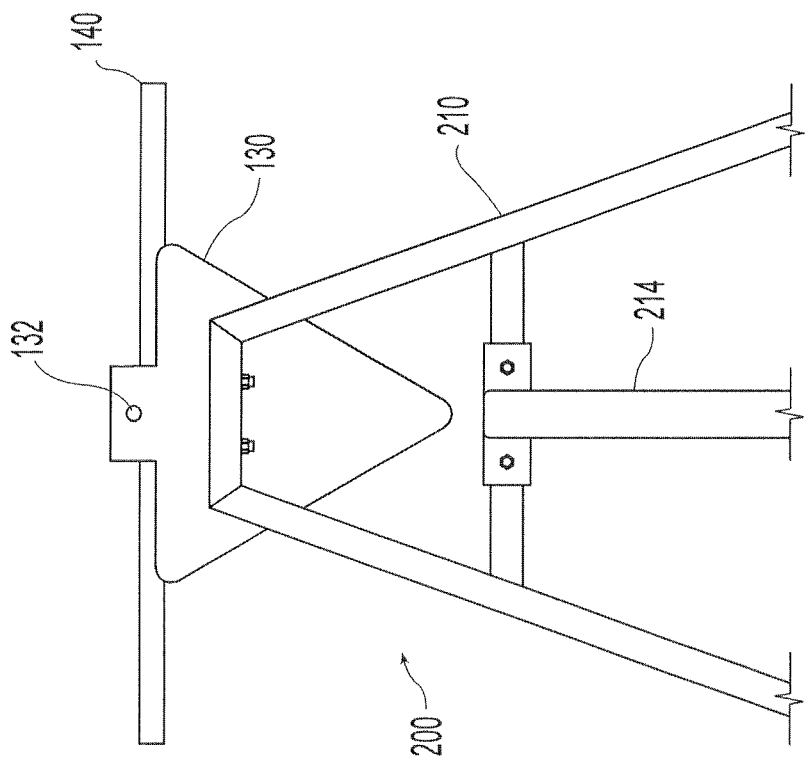
FIG. 4A is an enlarged side view of a portion of the solar array assembly of FIG. 1.
Figure 4B:
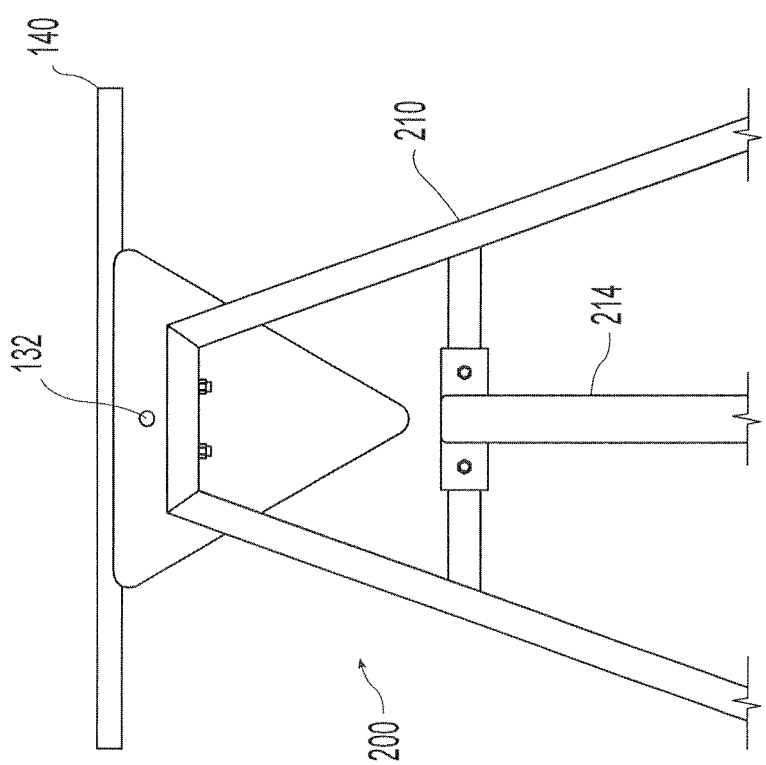
FIG. 4B shows an enlarged side view of an alternate embodiment of the solar array assembly of FIG. 1.

In one embodiment, as shown in FIG. 4A, shaft 132 is located at the center of mass of the axial cross-section elongated truss 105 and solar panel 140. Alternately, as shown in FIG. 4B, end plate 130 may be elongated in the direction of solar panels 140 and shaft 132 may be located at a position other than the center of mass of the axial cross-section elongated truss 105 and solar panel 140. In the embodiment of FIG. 4B, the longitudinal axis of shaft 132 may be located at a position corresponding to the top of solar panel 140 to permit the placement of an isolation pad between the angle and the solar panel frame.

At one end of the elongated truss 105, the shaft 132 may be coupled to a rotatable drive capable of rotatably driving shaft 132. As the rotatable drive turns shaft 132, elongated truss 105 may be rotated to orient the solar panels 140 corresponding to the change of direction of incoming solar energy. Alternately or in addition, a second rotatable drive may be coupled to shaft 132 located at the opposite end of elongated truss 105, providing additional or replacement capability to rotate shaft 132. Such multiple arrangement of rotatable drives may permits solar array 100 to continue operations while one rotatable drive is being serviced without having to provide an immediate replacement for a damaged rotatable drive, thereby decreasing the downtime of the solar array during routine maintenance or repair.

Alternately, solar array 100 may be configured such that elongated trusses 105 are positioned adjacent each other and oriented to have the same longitudinal axis. In such a configuration, the shafts 132 extending from each elongated truss 105 may be coupled to the same rotatable drive. Such a configuration may decrease solar array installation costs. Alternately or additionally, as shown in FIG. 1, a solar array 100 may be configured such that a plurality of elongated trusses 105 are arranged with parallel longitudinal axes and are capable of sharing a common skid member 216 at each end.

It has been found that solar array 100 may be used for capturing solar energy and converting that energy into electrical energy. In such a process, a solar array 100 as described above may be provided at a location with relatively low average cloud cover, for example 3 oktas or less on average, although the process may also be practiced at a location having a higher average cloud cover. As known in the art of meteorology, an okta is a measure of cloud cover based on how many eighths of the sky are obscured by clouds. After provision of solar array 100, the incoming solar energy may be captured using solar panels 140 by rotating solar array 140 in relation to a change of angle of the solar energy incident upon solar panels 140. Solar panels 140 may then transform the incoming solar energy into electrical energy, which in turn may be transferred to an electrically driven device. For example, a portion of the electrical energy may be used to drive a rotatable drive. Alternately or additionally, a portion of the electrical energy may be transferred to a storage battery for subsequent use or transferred to a municipal power grid.

While this invention has been described and illustrated with reference to various embodiments, it shall be understood that such description is by way of illustration and not by way of limitation. Accordingly, the scope and content of the present invention are to be defined only by the terms of the appended claims.

What is claimed is:

1. An elongated support truss having a polygonal axial cross-section, the elongated support truss comprising:
    V-shaped longitudinal members forming corners of the polygonal axial cross section, each of the V-shaped longitudinal members comprises an inner surface and an outer surface, wherein the inner surface of each of the V-shaped longitudinal members is located on a first side comprising an inner angle that is less than 180 degrees, and the outer surface of each of the V-shaped longitudinal members is located on a second side comprising an outer angle that is greater than 180 degrees; and
    open webs fixedly attached between adjacent V-shaped longitudinal members, the open webs extending at least a portion of a length of the elongated support truss along each side of the polygonal axial cross-section, each of the open webs comprising a plurality of bends in a same plane, the plurality of bends fixedly attached to a portion of the inner surface of the adjacent V-shaped longitudinal members.

2. The elongated support truss of claim 1, wherein the polygonal axial cross-section is a triangular cross-section and the inner angle of the V-shaped longitudinal members is 60 degrees.

3. The elongated support truss of claim 1, wherein the polygonal axial cross-section is a rectangular or square cross-section and the inner angle of the V-shaped longitudinal members is 90 degrees.

4. The elongated support truss of claim 1, wherein the polygonal axial cross-section is a pentagonal cross-section and the inner angle of the V-shaped longitudinal members is 108 degrees.

5. The elongated support truss of claim 1, wherein each of the open webs are welded to the V-shaped longitudinal members without having to place jigs or bracing to form the open webs or to secure the open webs to the adjacent V-shaped longitudinal members.

6. The elongated support truss of claim 1, further comprising:
    an end member fixedly attached at each end of the elongated support truss with a shaft extending longitudinally outwardly from the end member adapted to engage a drive to longitudinally rotate the elongated support truss;
    solar panels attached along one side of the elongated support truss of polygonal axial cross-section, and
    at least one rotatable drive capable of rotatably driving at least one of the shafts at the end of the elongated support truss to move the solar panels in relation to a change of direction of incoming solar energy.

7. The elongated support truss of claim 6, wherein the outwardly extending shaft is located at a position other than the center of mass of the elongated support truss of polygonal axial cross section.

8. The elongated support truss of claim 6, further comprising:
    an A-frame operatively coupled to each end of the elongated support truss.

9. The elongated support truss of claim 6, wherein the end member is a plate that is fixedly attached to each of the V-shaped longitudinal members.

10. An elongated support truss having a polygonal axial cross-section, the elongated support truss comprising:
    V-shaped longitudinal members forming corners of the polygonal axial cross section, each of the V-shaped longitudinal members comprises an inner surface and an outer surface, wherein the inner surface of each of the V-shaped longitudinal members is located on a first side comprising an inner angle that is less than 180 degrees, and the outer surface of each of the V-shaped longitudinal members is located on a second side comprising an outer angle that is greater than 180 degrees, and wherein the polygonal axial cross section is a triangular cross-section; and open webs fixedly attached between adjacent V-shaped longitudinal members, the open web extending at least a portion of a length of the elongated support truss along each side of the triangular cross-section, each of the open webs comprising a plurality of bends in the same plane, the plurality of bends fixedly attached to a portion of the inner surface of each of the adjacent V-shaped longitudinal members.

11. The elongated support truss of claim 10, wherein the open web is welded between the V-shaped longitudinal members.

12. The elongated support truss of claim 10, further comprising:

an end member fixedly attached at each end of the elongated support truss with a shaft extending longitudinally outwardly from the end member adapted to engage a drive to longitudinally rotate the elongated support truss;

solar panels attached along one side of the elongated support truss of polygonal axial cross-section, and at least one rotatable drive capable of rotatably driving the shafts at the end of the elongated support truss to move the solar panels in relation to a change of direction of incoming solar energy.

13. The elongated support truss of claim 12, further comprising:

an A-frame operatively coupled to each end of the elongated support truss.

14. The elongated support truss of claim 12, wherein the end member is a plate that is fixedly attached to each of the V-shaped longitudinal members.

15. A method for forming an elongated support truss with a polygonal axial cross-section, the method comprising:

assembling open webs between three or more V-shaped longitudinal members;

wherein the V-shaped longitudinal members form corners of the polygonal axial cross section, each of the V-shaped longitudinal members comprises an inner surface and an outer surface, wherein the inner surface of each of the V-shaped longitudinal members is located on a first side comprising an inner angle that is less than 180 degrees, and the outer surface of each of the V-shaped longitudinal members is located on a second side comprising an outer angle that is greater than 180 degrees;

wherein the open webs are fixedly attached between adjacent V-shaped longitudinal members, the open webs extending at least a portion of the length of the elongated support truss along each side of the polygonal axial cross-section, each of the open webs comprising a plurality of bends in a same plane, the plurality of bends fixedly attached to a portion of the inner surface of each of the V-shaped longitudinal members.

16. The method of claim 15, wherein assembling the plurality of open webs between three or more V-shaped longitudinal members comprises:

placing an open web between two V-shaped longitudinal members;

fixedly attaching each of the bends of the open web to a portion of the inner surface of the V-shaped longitudinal members continuously, forming a two-dimensional length of a first side of the elongated support truss without having to place jigs or bracing to form the open web or to secure the open web to the two V-shaped longitudinal members; and placing additional open webs between additional V-shaped longitudinal members and fixedly attaching each of the bends of the additional open webs to portions of the inner surfaces of the additional V-shaped longitudinal members continuously, forming additional sides of two-dimensional lengths to form the elongated support truss with the polygonal axial cross section with three or more sides.

17. The method of claim 15, wherein the polygonal axial cross-section is a triangular cross-section and the inner angle of the V-shaped longitudinal members is 60 degrees.

18. The method of claim 15, wherein the polygonal axial cross-section is a rectangular or square cross-section and the inner angle of the V-shaped longitudinal members is 90 degrees.

19. The method of claim 15, wherein the polygonal axial cross-section is a pentagonal cross-section and the inner angle of the V-shaped longitudinal members is 108 degrees.

20. The method of claim 15, wherein each of the open webs are welded to the V-shaped longitudinal members.

21. The method of claim 15, further comprising:

fixedly attaching an end member at each end of the elongated support truss including a shaft extending longitudinally outwardly from the end member adapted to engage a drive to longitudinally rotate the elongated support truss, attaching solar panels along one side of the polygonal cross-section of the elongated support truss;

assembling at least one rotatable drive capable of rotatably driving at least one of the shafts at the end of the elongated support truss to move the solar panels corresponding to a change of angle of incoming solar energy incident upon the solar panels;

capturing the incoming solar energy using the solar panels by rotating each solar array in relation to the change of angle of the incoming solar energy; and transforming the captured incoming solar energy into electrical energy for an electrical system.

* * * * *